Nov. 3, 1936.                F. J. HAIN                2,059,453
                              GOPHER TRAP
                          Filed Dec. 28, 1934
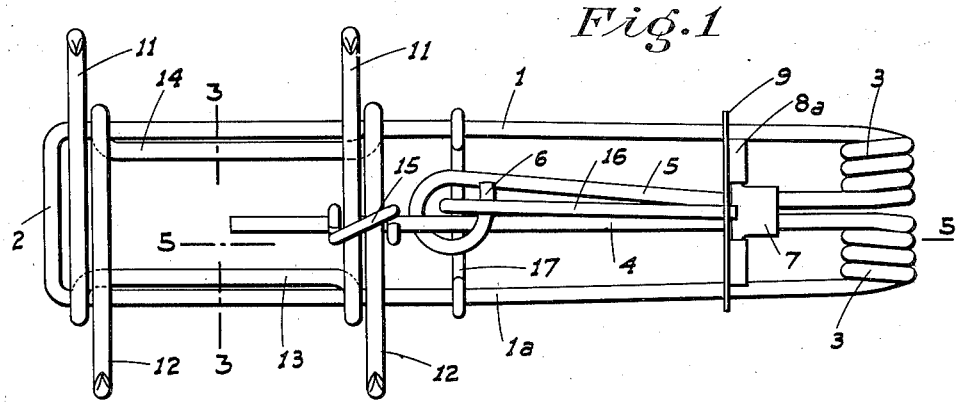
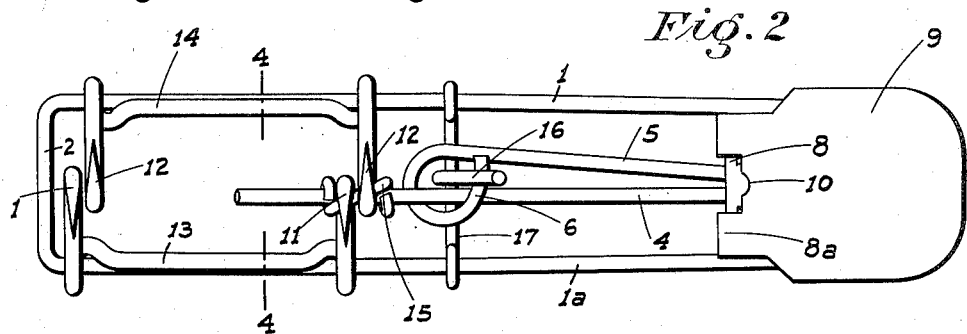
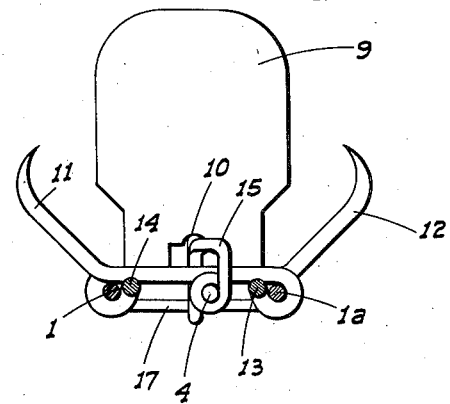
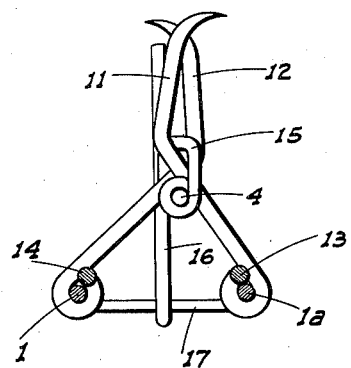
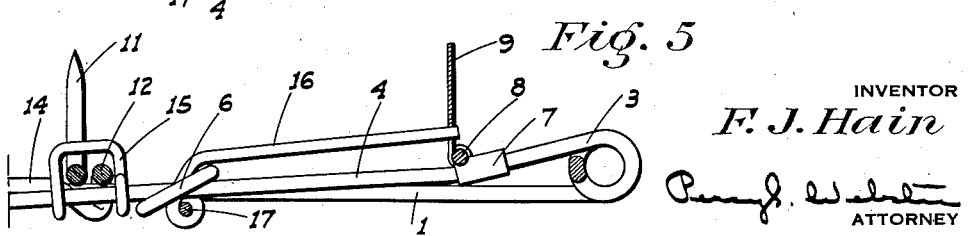
INVENTOR
F. J. Hain
ATTORNEY Patented Nov. 3, 1936

2,059,453

UNITED STATES PATENT OFFICE 2,059,453

GOPHER TRAP

Frank J. Hain, Manteca, Calif.

Application December 28, 1934, Serial No. 759,490

7 Claims. (Cl. 43—91)

This invention relates to gopher traps, my principal object being to provide a trap of this character having two longitudinally spaced sets of jaws, restrained or actuated by a single trigger disposed beyond both sets of jaws. By means of this construction I am able to catch large as well as small gophers with equal facility, and my trap will catch a considerable number of gophers which other traps now on the market miss, as I have proved from experience and as will be evident from the following description.

Also, my improved trap is extremely easy to set, without much chance of harm to the operator if the parts should slip while being set.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a top plan view of my improved trap as in its set position.

Figure 2 is a similar view showing the jaws tripped or sprung.

Figure 3 is a cross section on the line 3—3 of Figure 1.

Figure 4 is a cross section on the line 4—4 of Figure 2.

Figure 5 is a fragmentary longitudinal section on the line 5—5 of Figure 1.

Referring now more particularly to the characters of reference on the drawing, the frame of the trap as at present constructed comprises a pair of transversely spaced stiff wire elements 1 and 1a, connected at their outer end by an integral cross element 2 and formed at the other end with upstanding spring coils 3 disposed with their axes horizontal. From the inner end of one coil and integral therewith, a bar 4 extends lengthwise of the frame toward the opposite end; while from the corresponding end of the other coil a relatively short bar 5 similarly extends, said bar terminating in an open horizontal loop 6 embracing the bar 4 intermediate its ends. The coils are arranged so as to exert an upward pressure tending to lift or swing the bars 4 and 5 upwardly.

Near the coils said bars are rigidly connected by suitable means such as a sleeve 7 on which is secured a transversely extending pin 8. This pin forms the pivotal support for the base sleeves 8a of a trigger plate 9, said plate having a centrally located recess 10 in its lower edge above and between the sleeves.

The pairs of jaws mounted on my trap and both of which are disposed beyond the loop 6, each comprises hook shaped jaw elements 11 and 12 disposed in longitudinally offset but close relationship. The jaw elements 11 of both sets of jaws, and whose tips or outer ends, when said elements are outstretched or in a set position, are outwardly of the frame element 1, are turnably mounted on the opposed frame element 1a. Said jaw elements are integral with each other being connected by a rigid bar extending parallel to and adjacent said element 1a. Similarly the jaw elements 12 are turnably mounted on said element 1, are connected by a bar 14 and when in a set position, their outer ends are disposed outwardly of the element 1a.

In this manner the corresponding jaw elements of both sets can turn as a unit on the frame elements.

The bar 4 projects under the base portions of the pair of jaw elements nearest the trigger, and has an upstanding yoke 15 secured thereon which loosely straddles the adjacent portions of said jaws. The coils 3, as previously stated, tend to swing the bar upwardly, which causes the oppositely mounted jaw elements to be also swung upwardly so that their points or tips first approach and then pass beyond each other, as shown in Figure 4. When the bar 4 is held substantially horizontal, as when the trap is set and as shown in Figures 1 and 3, the jaws will swing down of themselves to a widely outstretched position, being initially moved in this direction by the spreading action of the downwardly moving yoke 15 acting on the upper surface of the jaws.

To hold the bar 4 down I provide a trigger bar 16. This bar passes through the loop 6 and is pivoted on a cross holder 17 extending between and secured to the frame elements 1 and 1a directly under the loop 6. The length of this bar 16 is sufficient to enable its free end when depressed to pass through the recess 10 of the trigger plate only when the latter is swung down away from the jaws and over the coils, as shown in Figure 2. Then when the trigger plate is raised it will pass over the adjacent end of the trigger bar and the latter will engage the recess 10 and cannot move upwardly. When the trigger bar is thus lowered it bears down on the loop 6 which being rigid with the bar 4 pulls the latter down against the resistance of the spring coils and thus holds the jaws set.

To thus set the trap, it is easiest to press down on the end of the bar 4 which is exposed between the two sets of jaws. This lowers the loop 6 about the trigger bar and enables the latter to be lowered to a trigger plate engaging position without resistance.

The set trap is disposed in a gopher hole or burrow, with the trigger plate disposed between the ground surface or exit of the burrow and the jaws. If necessary, dirt is built up around the trigger plate so that the latter completely plugs the exit. As a gopher approaches, it pushes dirt ahead and as soon as the dirt is banked up against the trigger plate with sufficient pressure it forces the same back. This releases the trigger bar bringing the jaws together in the manner previously described. A small gopher, pushing a relatively small amount of dirt ahead, is liable to be pierced or squeezed by the pair of jaws nearest the trigger plate. On the other hand, a large gopher which will push a relatively large amount of dirt ahead and consequently will not approach so close to the trigger plate will be caught by the pair of jaws furthest from said plate. This action on large and small gophers has been found to actually take place from considerable experience with my trap.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A gopher trap comprising a relatively long frame, a pair of sets of jaws mounted on the frame in longitudinally spaced relation, each set comprising a pair of opposed jaw elements and the corresponding elements of the sets being rigidly connected together, means applied to one set of jaws tending to spring the same, a trigger plate mounted on the frame beyond said one set of jaws, and means between said plate and the springing means to releasably hold the latter in restraint.

2. A gopher trap comprising a frame, a set of cooperating jaws of hook-like form, means pivoting the jaws at one end on the frame in transversely spaced relation, the portion of the jaws adjacent their pivots extending substantially horizontal and in crossing relation to each other when the jaws are set and the hook portions being then in relatively widely spaced facing relation to each other, a bar projecting lengthwise of the frame and under the crossing portions of the jaws, a spring mounted on the frame and connected to the bar to swing the same upwardly, a swingable trigger plate mounted on the frame beyond the jaws, a horizontal loop element rigid with the bar intermediate its ends, a trigger arm projecting through the loop, and a pivot connection between the lower end of the arm and the frame below the loop; the arm when swung down to depress and hold the bar in restraint being adapted to releasably engage the trigger plate when the latter is in a substantially vertical position transversely of the frame.

3. A gopher trap comprising a frame, a set of cooperating jaws of hook-like form pivoted at one end on the frame in transversely spaced relation, the portions of the jaws adjacent their pivoted ends extending substantially horizontal and in crossing relation to each other when the jaws are set and the hook portions being then in relatively widely spaced facing relation to each other, a spring urged bar extending lengthwise of and mounted at one end on the frame, the opposite free end of the bar extending under the crossing portions of the jaws and tending to lift at said end whereby the hook portions of the jaws will be moved toward each other, and trigger released means to hold the bar in restraint, said bar extending from the jaws toward its mounted end in the direction opposite to the direction of approach of a gopher toward the trap.

4. A gopher trap comprising a frame, a set of cooperating jaws of hook-like form pivoted at one end on the frame in transversely spaced relation, the portion of the jaws adjacent their pivoted ends extending substantially horizontal and in crossing relation to each other when the jaws are set and the hook portions being then in relatively widely spaced facing relation to each other, a spring urged bar extending lengthwise of and mounted at one end on the frame, the opposite free end of the bar extending under the crossing portions of the jaws and tending to lift at said end whereby the hook portions of the jaws will be moved toward each other, trigger released means to hold the bar in restraint, and means between the bar and jaws to limit the upward movement of the bar to a level below that of the points of the jaws when the latter are in a gripping position.

5. A gopher trap comprising a frame, a set of cooperating jaws of hook-like form pivoted at one end on the frame in transversely spaced relation, the portions of the jaws adjacent their pivoted ends extending substantially horizontal and in crossing relation to each other when the jaws are set and the hook portions being then in relatively widely spaced facing relation to each other, a spring urged bar extending lengthwise of and mounted at one end on the frame, the opposite free end of the bar extending under the crossing portions of the jaws and tending to lift at said end whereby the hook portions of the jaws will be moved toward each other, trigger released means to hold the bar in restraint, and a loop element mounted on and upstanding from the bar and straddling the adjacent portions of both jaws; the portions of the jaws beyond said first named portions being disposed at such an angle to the first named portions as to assume a substantially vertical position and to lie adjacent each other when the bar has lifted a predetermined distance whereby the top of the loop, passing between said vertical portions of the jaws, will prevent further closing movement of the same and lifting of the bar.

6. A gopher trap comprising a frame, a pair of longitudinally spaced sets of jaws, each set comprising a pair of opposed jaws, means pivoting the jaws at one end on the frame, the corresponding jaws of the sets being connected together by a common element, the portions of one set of the jaws adjacent their pivots extending substantially horizontal and in crossing relation to each other when the jaws are set and the hook portions being then in relatively widely spaced facing relation to each other, a spring urged element having a free end extending at one end under said crossing portions of the jaws and tending to lift at said end whereby the hook portions of the jaws will be moved toward each other, and trigger released means to hold said element in restraint.

7. A gopher trap comprising a frame, a pair of longitudinally spaced sets of jaws, each set comprising a pair of opposed jaws, means pivoting the jaws at one end on the frame, the corresponding jaws of the sets being connected together by a common element, the portions of one set of jaws adjacent their pivoted ends extending substantially horizontal and in crossing relation to each other when the jaws are set and the hook portions being then in relatively widely spaced facing relation to each other, a spring urged bar extending lengthwise of and mounted at one end on the frame, the opposite free end of the bar extending under the crossing portions of the jaws and tending to lift at said end whereby the hook portions of the jaws will be moved toward each other, and trigger released means to hold the bar in restraint.

FRANK J. HAIN.